United States Patent

Sangokoya et al.

[11] Patent Number: 5,565,395
[45] Date of Patent: Oct. 15, 1996

[54] ALUMINOXANATE COMPOSITIONS

[75] Inventors: Samuel A. Sangokoya; Milham S. Howie; Patrick G. Simms; Karl E. Wiegand, all of Baton Rouge, La.

[73] Assignee: Albemarle Corporation, Richmond, Va.

[21] Appl. No.: 452,170

[22] Filed: May 26, 1995

[51] Int. Cl.$^6$ .............................. B01J 31/00; B01J 37/00; C08F 4/02; C08F 5/06
[52] U.S. Cl. ..................... 502/103; 502/117; 556/175; 556/179
[58] Field of Search ........................ 502/103, 117

[56] References Cited

U.S. PATENT DOCUMENTS

| | | | |
|---|---|---|---|
| 4,187,210 | 2/1980 | Howard, Jr. | 260/42.14 |
| 4,564,647 | 1/1986 | Hayashi et al. | 523/211 |
| 4,659,685 | 4/1987 | Coleman, III et al. | 502/113 |
| 4,701,432 | 10/1987 | Welborn, Jr. | 502/113 |
| 4,774,269 | 9/1988 | Thum | 523/200 |
| 4,874,734 | 10/1989 | Kioka et al. | 502/104 |
| 5,006,500 | 4/1991 | Chang | 502/107 |
| 5,008,228 | 4/1991 | Chang | 502/111 |
| 5,015,749 | 5/1991 | Schmidt et al. | 556/179 |
| 5,093,295 | 3/1992 | Tomotsu et al. | 556/179 |
| 5,106,804 | 4/1992 | Bailly et al. | 502/108 |
| 5,235,081 | 9/1993 | Sangokoya | 502/117 |
| 5,252,529 | 10/1993 | Ueda et al. | 502/113 |
| 5,308,815 | 5/1994 | Sangokoya | 502/117 |
| 5,391,529 | 2/1995 | Sangokoya | 502/117 |

FOREIGN PATENT DOCUMENTS

| | | |
|---|---|---|
| 0644206 | 3/1995 | European Pat. Off. . |
| 3240382 | 5/1984 | Germany . |
| 6256411 | 9/1994 | Japan . |

*Primary Examiner*—Anthony McFarlane
*Assistant Examiner*—J. Pasterczyk
*Attorney, Agent, or Firm*—Philip M. Pippenger

[57] ABSTRACT

An aluminoxanate composition which can be used as a co-catalyst with transition, lanthanide or actinide metal compounds such as metallocenes comprises the solid reaction product of an aluminoxane and an alkali metal, alkaline earth metal, ammonium, phosphonium or sulfonium salt of a Group 13 to 16 element-containing polyoxy compound such as sodium aluminate.

20 Claims, No Drawings

ALUMINOXANATE COMPOSITIONS

The invention relates generally to aluminoxane derivatives which are useful components of olefin polymerization catalysts and more particularly to aluminoxanate compositions which are the reaction products of aluminoxanes, such as methylaluminoxane, and certain salts of polyoxy compounds such as sodium aluminate and lithium silicate.

Aluminoxanes are used in combination with various types of metallocenes and/or transition metal compounds to catalyze olefin oligomerization and polymerization. These catalyst components can be supported on inert solid carriers such as metal oxides, for example silica or alumina, for use in heterogeneous and gas phase polymerizations. It has now been found that aluminoxanes can be reacted with certain salts of polyoxy compounds to form novel catalyst compositions which are useful in making polymeric olefinic products. The polymers also have unique properties.

In accordance with this invention there is provided an aluminoxanate composition comprising the reaction product of an aluminoxane and a salt selected from the group consisting of alkali metal, alkaline earth metal, ammonium, phosphonium and sulfonium salts of Group 13 to 16 element-containing polyoxy compounds, which product contains from about 0.01 to 5.0 moles of salt per mole of aluminum in said aluminoxane.

Also provided is an olefin polymerization catalyst comprising (a) the solid reaction product of an aluminoxane and an alkali metal, alkaline earth metal, ammonium, phosphonium or sulfonium salt of a Group 13 to 16 element-containing polyoxy compound, and (b) a transition, lanthanide or actinide metal compound.

Also provided is a process for polymerizing an olefin comprising contacting an olefin with the catalyst, as defined above, under polymerization conditions.

Hydrocarbylaluminoxanes may exist in the form of linear or cyclic polymers with the simplest monomeric compounds being a tetraalkylaluminoxane such as tetramethylaluminoxane, $(CH_3)_2AlOAl(CH_3)_2$, or tetraethylaluminoxane, $(C_2H_5)_2AlOAl(C_2H_5)_2$. The compounds preferred for use in olefin polymerization catalysts are oligomeric materials, sometimes referred to as polyalkylaluminoxanes, which usually contain about 4 to 20 of the repeating units:

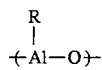

where R is $C_1$–$C_{10}$ alkyl and especially preferred are polymethylaluminoxanes (MAOs). The methylaluminoxanes can contain some higher alkyl groups to improve their solubility. Such modified methylaluminoxanes are described, for example, in U.S. Pat. No. 5,157,008. Besides MAO, non-limiting examples of hydrocarbylaluminoxanes for use in the invention include ethylaluminoxanes (EAO), isobutylaluminoxanes (IBAO), n-propylaluminoxanes, n-octylaluminoxanes, and the like. The hydrocarbylaluminoxanes can also contain up to about 20 mole percent (based on aluminum) of moieties derived from amines, alcohols, ethers, esters, phosphoric and carboxylic acids, thiols, alkyl disiloxanes and the like to improve activity, solubility and/or stability.

The aluminoxanes can be prepared as known in the art by the partial hydrolysis of trialkylaluminum compounds. The trialkylaluminum compounds can be hydrolyzed by adding either free water or water containing solids, which can be either hydrates or porous materials which have absorbed water. Because it is difficult to control the reaction by adding water per se, even with vigorous agitation of the mixture, the free water is preferably added in the form of a solution or a dispersion in an organic solvent. Suitable hydrates include salt hydrates such as, for example, $CuSO_4 \bullet 5H_2O$, $Al_2(SO_4)_3 \bullet 18H_2O$, $FeSO_4 \bullet 7H_2O$, $AlCl_3 \bullet 6H_2O$, $Al(NO_3)_3 \bullet 9H_2O$, $MgSO_4 \bullet 7H_2O$, $MgCl_2 \bullet 6H_2O$, $ZnSO_4 \bullet 7H_2O$, $Na_2SO_4 \bullet 10H_2O$, $Na_3PO_4 \bullet 12H_2O$, $LiBr \bullet 2H_2O$, $LiCl \bullet 1H_2O$, $LiI \bullet 2H_2O$, $LiI \bullet 3H_2O$, $KF \bullet 2H_2O$, $NaBr \bullet 2H_2O$ and the like and alkali or alkaline earth metal hydroxide hydrates such as, for example, $NaOH \bullet H_2O$, $NaOH \bullet 2H_2O$, $Ba(OH)_2 \bullet 8H_2O$, $KOH \bullet 2H_2O$, $CsOH \bullet 1H_2O$, $LiOH \bullet 1H_2O$ and the like. Mixtures of any of the above hydrates can be used. The mole ratios of free water or water in the hydrate or in porous materials such as alumina or silica to total alkyl aluminum compounds in the mixture can vary widely, such as for example from about 2:1 to 1:4 with ratios of from about 4:3 to 1:3.5 being preferred.

Such hydrocarbylaluminoxanes and processes for preparing hydrocarbylaluminoxanes are described, for example, in U.S. Pat. Nos. 4,908,463; 4,924,018; 5,003,095; 5,041,583; 5,066,631; 5,099,050; 5,157,008; 5,157,137; 5,235,081; 5,248,801, and 5,371,260 whose entire teachings are incorporated herein by reference. The methylaluminoxanes contain varying amounts, of from about 5 to 35 mole percent, of the aluminum value as unreacted trimethylaluminum. Preferably the aluminum content as trimethylaluminum is less than about 23 mole percent of the total aluminum value, and more preferably less than about 20 mole percent.

The hydrocarbylaluminoxanes are reacted with certain salts of polyoxy compounds to form novel aluminoxane compositions which are referred to herein as aluminoxanates. When these aluminoxanates are combined with metallocenes and/or other transition metal compounds, solid granular olefin polymerization catalysts are typically formed which are, in effect, solid catalyst compositions useful as heterogeneous polymerization catalysts for slurry, bulk or gas phase processes.

The salts of polyoxy compounds for use in forming the compositions of the invention include alkali metal, alkaline earth metal (Groups 1 and 2 elements of the new IUPAC notation for the Periodic Table, for example, Li, Na, K, Cs, Mg, Ca, Ba), and ammonium, phosphonium, or sulfonium salts of Group 13 to 16 element-containing polyoxy compounds, for example, polyoxy compounds which contain elements such as Al, B, Ga, C, Si, Ge, P, As, S and Se, which salts can be either anhydrous or moderately hydrated (1 to 6 weight percent $H_2O$). Non-limiting examples of such salts include $NaAlO_2$, $LiAlO_2$, $Na_2CO_3$, $Na_3PO_4$, $Li_2SiO_3$, $Na_2SiO_3$, $Li_2(CO_2)_2$, $LiBO_2$, $Li_2B_4O_7$, $LiNO_3$, $K_2AsO_4$, $LiAl(SiO_3)_2$, $LiC_6H_5CO_2$, $NaCF_3CO_2$, $Mg(C_2H_3O_2)_2$, $NH_4Al(SO_4)_2$, $(NH_4)_2B_4O_7$, $(PH_4)_2SO_4$, $(NH_4)_2SeO_3$, and the like. The ammonium, phosphonium and sulfonium salt cations can include their organ substituted analogs, for example, tetraalkyl, tetra (mixed) alkyl, tetraaryl, and tetra (aryl, alkyl) substituted cations such as tetraethylammonium, tetraphenylammonium, tetrabenzylammonium, dimethyldiphenylammonium as well as the corresponding phosphonium and sulfonium analogs. Some of these salts are not readily available but can be derived from the more readily available species by ion exchange reactions.

When the salt is allowed to react with an aluminoxane in an inert organic solvent, typically there is transient formation of a second liquid phase and the reaction product turns into an insoluble solid on standing. A particulate solid (granular or powder) results when the solvent is removed. The compositions are believed to be about one to one molar reaction products of salt and aluminoxane but the metal salt can be combined in proportions of from about 0.01 to 5.0 moles per mole of aluminum in the aluminoxane, preferably from about 0.1 to 3.0 moles per mole and, more preferably, about 0.8 to 1.2 moles per mole of aluminum in the aluminoxane.

Any inert organic solvent or solvent mixture can be used as the reaction medium. Non-limiting examples of solvents include aliphatic hydrocarbons such as pentane, isopentane, hexane, cyclohexane, heptane, octane, decane, dodecane, hexadecane, octadecane and the like, with those having carbon numbers of 5 to 10 being preferred, and aromatic hydrocarbons such as benzene, chlorobenzene, toluene, xylene, cumene and the like, with those having carbon numbers of 6 to 20 being preferred. The aromatic solvents are preferred. The amount of solvent used is not critical and usually depends on the concentration of aluminoxane solutions used, which is generally chosen to be from about 5 to 50 weight percent and preferably from 10 to 35 weight percent. The most preferred concentration is from about 15 to 30 weight percent. The salt can be added directly or as a slurry in the same or different solvent as the aluminoxane. The form of and order of addition of reactants is not critical. For example, the aluminoxane, solid or solution, can be added to a slurry of the salt in a solvent or the solid salt or slurry be added to an aluminoxane solution. The reaction temperature can range from about 0° C. to 150° C. with about 20° C. to 100° C. being preferred.

A notable result of methylaluminoxanate formation is that the solid product contains no trimethylaluminum as indicated by pyridine titration. It should also be noted that the variability in trimethylaluminum content of methylaluminoxane is probably the major source of inconsistency in previously known supported catalyst systems. Therefore, this invention provides a means to avoid this inconsistency.

The aluminoxanates can be used in combination with metallocenes and/or transition metal compounds to provide the term "metallocene" includes metal derivatives which contain at least one cyclopentadienyl moiety. Suitable metallocenes are well known in the art include the metallocenes of Groups 3, 4, 5, 6, lanthanide and actinide metals, for example, the metallocenes which are described in U.S. Pat. Nos. 2,864,843; 2,983,740; 4,665,046; 4,874,880; 4,892, 851; 4,931,417; 4,952,713; 5,017,714; 5,026,798; 5,036, 034; 5,064,802; 5,081,231; 5,145,819; 5,162,278; 5,245, 019; 5,268,495; 5,276,208; 5,304,523; 5,324,800; 5,329, 031; 5,329,033; 5,330,948, 5,347,025; 5,347,026; and 5,347,752, whose teachings with respect to such metallocenes are incorporated herein by reference.

Non-limiting illustrative examples of such metallocenes are bis(cyclopentadienyl)zirconium dimethyl, bis(cyclopentadienyl)zirconium dichloride, bis(cyclopentadienyl)zirconium monomethylmonochloride, bis(cyclopentadienyl)titanium dichloride, bis(cyclopentadienyl)titanium difluoride, cyclopentadienylzirconium tri-(2-ethylhexanoate), bis(cyclopentadienyl)zirconium hydrogen chloride, bis(cyclopentadienyl)hafnium dichloride, racemic and meso dimethylsilanylene-bis(methylcyclopentadienyl)hafnium dichloride, racemic dimethylsilanylene-bis(indenyl)hafnium dichloride, racemic ethylene-bis(indenyl)zirconium dichloride, ($\eta^5$-indenyl)hafnium trichloride, ($\eta^5$-$C_5Me_4$)hafnium trichloride, racemic dimethylsilanylene-bis(indenyl)thorium dichloride, racemic dimethylsilanylene-bis(4,7-dimethyl-1-indenyl)zirconium dichloride, racemic dimethylsilanylene-bis(indenyl)uranium dichloride, racemic dimethylsilanylene-bis( 2,3, 5-trimethyl-1-cyclopentadienyl)zirconium dichloride, racemic dimethylsilanylene(3-methylcyclopentadienyl)-hafnium dichloride, racemic dimethylsilanylene-bis(1-(2-methyl-4-ethyl)indenyl) zirconium dichloride; racemic dimethyl-silanylene-bis(2 -methyl-4,5,6,7-tetrahydro-1-indenyl)zirconium dichloride, bis(pentamethylcyclopentadienyl)-thorium dichloride, bis(pentamethylcyclopentadienyl)uranium dichloride, (tert-butylamido)dimethyl(tetramethyl-$\eta^5$ -cyclopentadienyl)silanetitanium dichloride, (tert-butyl- amido)dimethyl(tetramethyl-$\eta^5$-cyclopentadienyl)silane-chromium dichloride (tert-butylamido)dimethyl (-$\eta^5$ -cyclopentadienyl)silanetitanium dichloride, (tert-butylamido)dimethyl(tetramethyl-$\eta^5$ -cyclopentadienyl)-silanemethyltitanium bromide, (tert-butylamido)(tetramethyl-$\eta^5$-cyclopentadienyl)-1,2-ethanediyluranium dichloride, (tert-butylamido)(tetramethyl-$\eta^5$-cyclopentadienyl)-1,2 -ethanediyltitanium dichloride, (methylamido)(tetramethyl-$\eta^5$ -cyclopentadienyl)-1,2-ethanediylcerium dichloride, (methylamido)(tetramethyl-$\eta^5$-cyclopentadienyl)-1,2 -ethanediyltitanium dichloride, (ethylamido)(tetramethyl-$\eta^5$ -cyclopentadienyl)methylenetitanium dichloride, (tert-butylamido)dibenzyl(tetramethyl-$\eta^5$ -cyclopentadienyl)-silanebenzylvanadium chloride, (benzylamido)dimethyl-(indenyl)silanetitanium dichloride, and (phenylphosphido)-dimethyl(tetramethyl-$\eta^5$-cyclopentadienyl)silanebenzyl-titanium chloride.

Suitable transition metal compounds include the well known Ziegler-Natta catalyst compounds of Group 4–6 metals. Non-limiting illustrative examples of such transition metals include $TiCl_4$, $TiBr_4$, $Ti(OC_2H_5)_3Cl$, $Ti(OC_2H_5)Cl_3$, $Ti(OC_4H_9)_3Cl$, $Ti(OC_3H_7)_2Cl_2$, $Ti(OC_8H_{17})_2Br_2$, $VCl_4$, $VOCl_3$ $VO(OC_2H_5)_3$, $ZrCl_4$, $ZrCl_3(OC_2H_5)$, $Zr(OC_2H_5)_4$ and $ZrCl(OC_4H_9)_3$ and the like.

The molar proportions of metallocene and/or transition metal compound in the catalyst composition to the aluminum derived from the aluminoxane in the aluminoxanate are selected to provide the desired degree of polymerization activity and generally range from about $1\times10^{-1}$ to $1\times10^{-4}$ to 1 and preferably from about $2\times10^{-1}$ to $5\times10^{-4}$ to 1.

A surprising advantage of using aluminate salts, such as sodium or lithium aluminate is that the aluminum in the aluminate contributes to the catalytic activity of the aluminoxane-aluminate composition. This contribution is about equivalent to that of the aluminum in MAO thereby allowing the use of only about one half the amount of the more expensive MAO in order to obtain the same activity.

The aluminoxanates and metal compound can be added separately to the polymerization reactor but are preferably prereacted. The aluminoxanates can be reacted with the metallocenes and/or transition metal compounds in any inert organic solvent, such as those defined above for the aluminoxane-salt reaction. The reaction temperature can range from about 0° C. to 150° C. Preferred reaction temperatures range from about 20° C. to 100° C.

In an alternate way of preparing the catalyst compositions of the invention, the metallocene can be premixed with the salt of the polyoxy-compound before the salt and aluminoxane are reacted. Also, the aluminoxane and metallocene can be combined and then reacted with the salt of the polyoxy compound. The salts of the polyoxy compound can be activated prior to reaction with the catalyst components by treatment with a Lewis acid such as a trialkylaluminum, an alkylaluminum halide or a polysiloxane.

The catalysts are effective to produce olefin polymers and especially ethylene polymers, propylene polymers and ethylene/α-olefin copolymers. Examples of olefins that can be polymerized in the presence of the catalysts of the invention include α-olefins having 2 to 20 carbon atoms such as ethylene, propylene, 1-butene, 1-hexene, 4-methyl-1-pentene, 1-octene, 1-decene, 1-dodecene, 1-tetradecene, 1-hexadecene, and 1-octadecene. Polymerization of ethylene or copolymerization with ethylene and an α-olefin having 3 to 10 carbon atoms is preferable. Such polymerizations may be performed in either the gas or liquid phase (e.g. in a solvent, such as toluene, or in a diluent, such as heptane). The polymerization can be conducted at conventional temperatures (e.g., 0° to 250° C.) and pressures (e.g., ambient to 50 kg/cm$^2$) using conventional procedures as to molecular weight regulation and the like. Under certain conditions, broad molecular weight polyolefins are obtained. Polymerization conditions could be adjusted however to obtain other molecular weight distributions.

The invention is further illustrated by, but is not intended to be limited to, the following examples. The examples were carried out under inert atmospheric conditions using Schlenk glassware and vacuum line in conjunction with a N$_2$-drybox. Solvents were distilled using standard methods. Filtration and vacuum distillation were done inside a N$_2$-drybox and distillates were collected in a trap at −78° C. Salts of polyoxycompounds were purchased from commercial sources. Methylaluminoxane (MAO) was obtained from stock solutions produced and marketed by Albemarle Corporation.

EXAMPLE 1

Aluminoxane-Aluminate Composition

A toluene solution of MAO (64 grams, 377 mmol Al) having less than 22 percent of the total aluminum value as TMA, was placed in a reaction bottle. Then, NaAlO$_2$ (15.5 grams, 188 mmol) was slowly added in batches during about 15 minutes. During addition, the mixture became exothermic with some gas evolution. The original solid-liquid slurry slowly turned into a two phase liquid slurry. The dense lower layer slowly turned thicker and thicker and finally to solid slurry again. The solid in the final product is about double the initial solid reagent. At this point the mixture was heated with stirring for two hours at 70° C. (oil bath). The mixture was filtered and the solid product was washed with toluene. Analysis showed that the liquid washings contained 143 mmol Al and the dried solid product contained 365 mmol Al. One would not expect to lose much of the original aluminum value in NaAlO$_2$ (188 mmol), therefore 177 mmol Al is postulated to have come from MAO. The new product, methylaluminoxane-aluminate composition is, therefore, composed of almost equal amounts of aluminum from MAO and from NaAlO$_2$.

Further analysis showed weight percent Al=34, gas evolution=9.1 mmol/gram, methane evolution=8.9 mmol/gram, and TMA content=0.0 mmol/gram (i.e., no titratable TMA content by the pyridine method.)

EXAMPLE 2

Aluminoxane-Silicate Composition

MAO solution (70 grams, 336 mmol Al), having less than 22 percent of the total aluminum value as TMA, was placed in a reaction bottle. Solid lithium silicate (Li$_2$SiO$_3$, 30.2 grams, 336 mmol) was slowly added in batches, while stirring during about 20 minutes. The mixture was stirred at room temperature for one hour and then heated at 80° C. (oil bath) for two hours. Heptane (100 ml) was added and suddenly the product became oily to give a lower dense slurry (transient liquid clathrate formation). The oily product was then heated at 90° C. (oil bath) for another two hours to give a solid cake at the bottom of the flask. The upper liquid layer was decanted. Heptane (400 ml) was added to the solid cake and was also broken into pieces using a spatula. The mixture was again heated for another two hours at 90° C. (oil bath) and then filtered hot. The solid product was washed several times with hot heptane and then vacuum dried to give free flowing solid product. 77 percent of the original aluminum value was incorporated into the new compound, methylaluminoxane-silicate composition. Analysis showed 15 weight percent Al, 13 weight percent Li and no trimethylaluminum content.

EXAMPLE 3

Aluminoxane-Carbonate Composition

Methylaluminoxane solution in toluene (105 grams, 504 mmol Al) was placed in a reaction bottle. Sodium carbonate (53.4 grams, 504 mmol) was slowly added with stirring in batches during about 10 minutes. The reaction was not exothermic and there was no apparent gas evolution. The reaction mixture was allowed to stir at room temperature for 30 minutes and then heated at 90° C. (oil bath) for about three hours. The flocculent solid (Na$_2$CO$_3$) slowly started to turn denser and denser (transient liquid clathrate) and the slurry became difficult to stir. The slurry was filtered in the N$_2$-drybox. The sticky solid residue was then suspended in heptane (200 ml) with stirring. The slurry was again filtered to obtain free flowing solid product, methylaluminoxane-carbonate composition. The solid was vacuum dried to obtain 79 grams of product.

Analysis showed that 84 percent of the original aluminum value was incorporated into the methylaluminoxanate composition. The solid product contained no TMA but contained 5.4 mmol Al/gram with gas/Al ratio of 1.03.

EXAMPLE 4

Metallocene/MAO-Aluminate Composition

The product of Example 1 (8 grams, 100 mmol Al) was suspended in heptane (100 ml). Then zirconocene dichloride (1 mmol) was added. The mixture was stirred at room temperature overnight. The colorless slurry slowly turned orange and then orange brown. The mixture was filtered to obtain yellow brown solid product. The solid was vacuum dried to obtain 7.8 grams of product. Analyses of product gave 33.7 weight percent Al, 14.6 weight percent Na and 1.5 weight percent of Zr.

EXAMPLE 5

Metallocene/MAO-Silicate Composition

The product of Example 2 (10 grams, 55 mmol Al) was suspended in heptane (100 grams). Then zirconocene dichloride (1.7 mmol) was added. The slurry slowly turned yellowish and was stirred overnight to obtain brown solid product. The slurry was filtered and then vacuum dried to give 10.3 grams of product. Analyses of product gave 16.6 weight percent Al, 8.56 weight percent Li and 1.69 weight percent Zr.

EXAMPLE 6

Ethylene Polymerization

A 600 ml autoclave charged with dry toluene (300 ml) and supported catalyst system, methylaluminoxane-aluminate/zirconocene dichloride composition [1 gram, 12 mmol total Al (i.e. from MAO and from NaAl$_2$), 0.01 mmol Zr]. The slurry was heated to 70° C. and then ethylene was admitted for 20 minutes at 60 psi. At the end of reaction, the content of the autoclave was poured into a beaker and an equal volume of methanol was added. The polyethylene was collected by filtration followed by further washings with methanol. The dried polyethylene product was 34 grams which corresponds to 2.8×10$^4$ grams PE/g.Zr.atm.hr. A GPC polymer analysis showed a bimodal molecular weight distribution. The polymerization process, therefore, provides a unique polymer without the use of dual catalysts. Also, the activity of the catalyst is substantially the same as that which is obtained using 12 mmol total Al from MAO in place of the methylaluminoxane-aluminate.

What is claimed is:

1. An aluminoxanate composition comprising the reaction product of an aluminoxane and a salt selected from the group consisting of alkali metal, alkaline earth metal, ammonium, phosphonium and sulfonium salts of Group 13 to 16 element-containing polyoxy compounds, which product is made from about 0.01 to 5.0 moles of salt per mole of aluminum in said aluminoxane.

2. The composition of claim 1 wherein said salt is selected from the group consisting of alkali or alkaline earth metal aluminates, silicates, phosphates, carbonates, and carboxylates.

3. The composition of claim 1 wherein said aluminoxane is a polymethylaluminoxane.

4. The composition of claim 3 wherein said polymethylaluminoxane contains less than about 23 percent of the total aluminum as trimethylaluminum and the aluminoxanate composition contains no trimethylaluminum.

5. The composition of claim 2 wherein said aluminoxane is a polymethylaluminoxane and said salt is an aluminate.

6. The composition of claim 5 wherein said polymethylaluminoxane contains less than about 23 mole percent of the total aluminum value as trimethylaluminum and the aluminoxanate composition contains no trimethylaluminum.

7. The composition of claim 1 wherein said composition is in particulate form.

8. The composition of claim 1 wherein said composition is made from about 0.1 to 3.0 moles of salt per mole of aluminum in said aluminoxane.

9. An olefin polymerization catalyst comprising (a) the reaction product of an aluminoxane and a salt selected from the group consisting of alkali metal, alkaline earth metal, ammonium, phosphonium and sulfonium salts of Group 13 to 16 element-containing polyoxy compounds, and (b) a metallocene.

10. The catalyst of claim 9 wherein said salt is an alkali metal or alkaline earth metal salt and said reaction product is made from about 0.01 to 5.0 moles of salt per mole of aluminum in said aluminoxane.

11. The catalyst of claim 10, wherein said aluminoxane is a methylaluminoxane, said reaction product is made from about 0.1 to 3.0 moles of salt per mole of aluminum in said aluminoxane and the molar ratio of the metallocene per mole of aluminum derived from said methylaluminoxane is from about 1×10$^{-1}$ to 1×10$^{-4}$:1.

12. An olefin polymerization catalyst comprising the solid reaction product of an aluminoxane, a transition, lanthanide or actinide metal compound and a salt selected from the group consisting of alkali metal, alkaline earth metal, ammonium, phosphonium and sulfonium salts of Group 13 to 16 element-containing polyoxy-compounds.

13. The catalyst of claim 12 wherein said solid reaction product is made from about 0.1 to 5.0 moles of salt per mole of aluminum in said aluminoxane.

14. The catalyst of claim 12 wherein said metal compound is a metallocene of a Group 4 to 6 metal.

15. The catalyst of claim 12 wherein said aluminoxane is a methylaluminoxane.

16. The catalyst of claim 14 wherein said aluminoxane is a methylaluminoxane.

17. The catalyst of claim 13 wherein said salt is selected from the group consisting of alkali or alkaline earth metal aluminates, silicates, phosphates, carbonates, and carboxylates.

18. The catalyst of claim 17 wherein said salt is selected from the group consisting of sodium aluminate, lithium aluminate, lithium silicate and sodium carbonate.

19. The catalyst composition of claim 14 wherein said catalyst contains from about 1×10$^{-1}$ to 1×10$^{-4}$ mole of metallocene per mole of aluminum in said aluminoxane and said reaction product is made from 0.1 to 3.0 moles of salt per mole of aluminum in said aluminoxane.

20. The catalyst composition of claim 12 wherein said composition is in particulate form.

* * * * *